Nov. 18, 1958 T. M. DEAKIN 2,860,451
GEAR GENERATING MACHINES
Filed Jan. 24, 1952 8 Sheets-Sheet 1

FIG. 1.

Inventor
Thomas Meyrick Deakin
By Karl W. Flocks
Attorney

Inventor
Thomas Meyrick Deakin
By Karl W. Flocks
Attorney

United States Patent Office 2,860,451
Patented Nov. 18, 1958

2,860,451

GEAR GENERATING MACHINES

Thomas Meyrick Deakin, London, England, assignor to Deakin Gears Limited, London, England, a company of Great Britain Application January 24, 1952, Serial No. 267,986

Claims priority, application Great Britain January 31, 1951

13 Claims. (Cl. 51—56)

This invention relates to gear generating machines for forming or measuring the profiles of gear teeth and is particularly concerned with machines which operate on the "generating roll" principle in which the work and the tool are given a relative motion equivalent to that produced either by the rolling of a cylinder or cone representing the gear on a plane (hereinafter called the generating plane) which contains a generator (represented by the tool) for the tooth profile to be formed, or by the meshing of the finished gear with a master gear or tooth represented by the tool. Such relative motion between the work and the tool has two components, the first component being the rotation of the work about its own axis and the second component being the displacement of the work axis itself. Machines which operate on this principle will be referred to in this specification as gear generating machines of the type specified.

In bevel gear generating machines of the type specified it is customary to oscillate the tool about an axis which passes through a datum point representing the cone apex of a bevel gear whilst the work is correspondingly oscillated about its own axis, the ratio between the rotations of the tool and the work being fixed in dependence on the cone angle of the gear and the nature of the tooth profile. Corresponding motions are also adopted in spur gear generating machines.

The present invention has for an object to provide a gear generating machine of the type specified which is suitable for producing or measuring either spur or bevel gears having a variety of tooth profiles.

In a gear generating machine of the type specified according to the present invention, the work-head and the tool cradle are connected to respective rigid reciprocable members in such manner that the linear displacement of each said member with reference to a common datum is always proportional to the said first and second components respectively, of the generating roll motion also with reference to a common datum, and means are provided for adjustably interconnecting said rigid reciprocable members so as to establish a desired proportionality between the linear displacements thereof.

In the following description of various embodiments of the invention, it is to be understood that the precise construction and arrangement of the parts are illustrative only of the invention and could in practice be adapted and modified where necessary to suit the particular circumstances in view, although without changing the essential nature of the functions to be performed by each part.

All embodiments now to be described may be regarded as universal machines in that they are capable of generating both spur and bevel gears, the former class including straight and helical gears and the latter class including straight, spiral and skew bevel gears. In a practical machine, however, it may not always be desirable to make provision for the generation of all types of gears, as will be understood by those skilled in the art. For the sake of completeness, however, and in order that the invention may be fully understood in all its aspects, such universal machines will be described.

The invention will be more clearly understood from the following specific descriptions of various embodiments thereof with reference to the accompanying drawings in which.

Throughout the drawings, like parts carry similar reference numerals.

Figure 1:
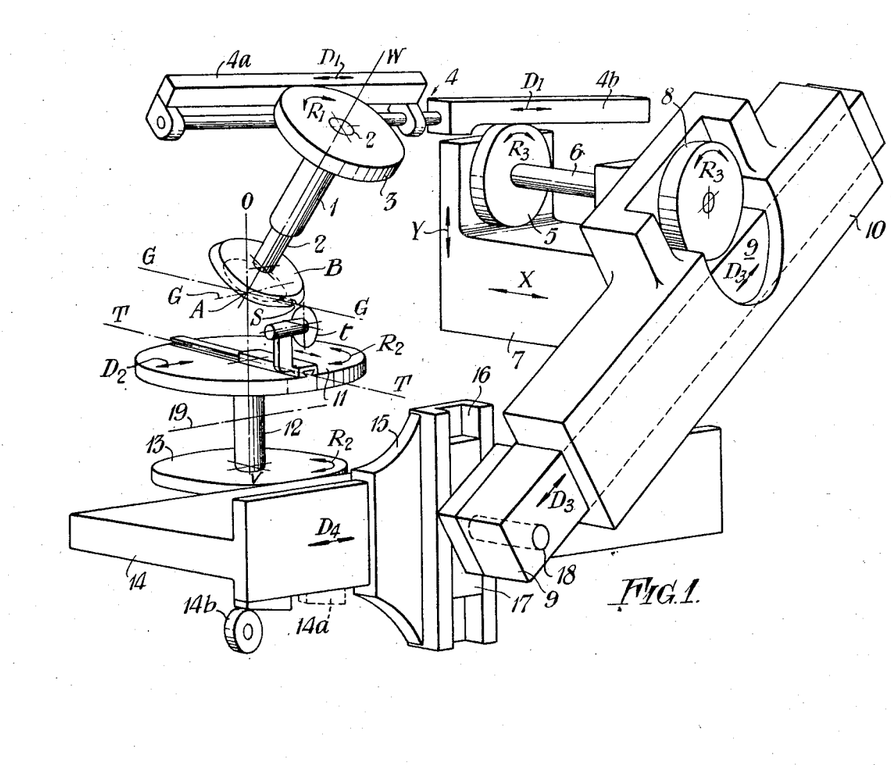
Fig. 1 is a schematic layout of a first embodiment operating on the so-called "split-roll" principle.

Fig. 1 illustrates the layout of components in a gear generating machine of the "split" roll type. The machine has the work-head 1 adjustable in a plane normal to the generating plane GG (shown here as horizontal) through a range of angles from 0° to 90°. The axis of rotation AW of the work B is arranged always to pass through a datum point A which is fixed in relation to the machine frame and constitutes the true apex of a bevel gear. The apex A normally lies in the generating plane, so that the angle between the axis of rotation AW of the work B and the generating plane GG constitutes the half cone angle of the bevel gear being generated. In the case of spur gears, the work axis AW is parallel to the generating plane GG, and the work-head 1 and tool cradle 11 are relatively adjustable in the direction of the axis OV. This adjustment may be accommodated either by the work-head or by the tool cradle mounting, according to convenience of design of the machine.

The work spindle 2 of the work-head 1 has keyed or otherwise affixed thereon a disc 3 or sector which is coupled in non-slipping relationship to a rectilinear coupling slide 4. The form of non-slip coupling is immaterial but it is preferred that it take the form (to be described with reference to Figs. 8 and 9) of a pair of flexible but inextensible driving bands oppositely wrapped around at least the working arcs on the periphery of the sector or disc 3 and laid along the correspondingly engageable portions of the slide 4, the bands being firmly anchored under tension to the respective parts at their opposite ends.

The said rectilinear coupling slide 4 is guided for reciprocation (as indicated by the double-headed arrow $D_1$) in the direction of its length with rotation of the work B about its axis AW and is also capable of following the workhead 1 as the latter is adjusted to suit differing cone angles of the gears to be generated. Any suitable mechanical arrangement may be adopted for guiding the rectilinear slide 4 according to the circumstances obtaining at any given machine. In the present embodiment the slide is shown diagrammatically in two portions 4a, 4b, the portion 4a which is coupled to the sector or disc 3 on the work-head 1 being capable of swinging bodily about an axis parallel to the direction of reciprocation of the slide 4, but not displaceable relatively to the other portion 4b in this direction.

The other portion 4b of the coupling slide 4 is capable of bodily displacement in two directions X, Y at right angles and perpendicular to its length, these directions being the rectangular co-ordinates of the angular adjustment of the work-head 1 for varying work pitch angles and cone distances. This portion 4b of the slide 4 is also coupled in non-slipping fashion to a disc or sector 5 which is keyed on a shaft 6 carried in bearings on a saddle 7 which may also carry the driving motor and transmission (not shown) for operating the machine. The shaft 6 is arranged to follow the movements in the X and Y directions of the slide 4.

The shaft 6 also carries a second disc or sector 8 at its other end which is coupled—again in non-slipping fashion—to a first generating roll component slide 9 which is reciprocable in a housing 10 journalled on the shaft. The slide 4 and the shaft 6 and its discs or sectors 5, 8 form a transmission whereby the displacement of the said first slide 9 is always proportional to the first component of the generating roll. The said first slide 9 extends forward in the general direction of the tool cradle 11 which is mounted for rotation about an axis OV normal to the generating plane GG, and which will, in most bevel gear generating cases, pass through the apex A. Provision is, however, made for the bodily displacement (indicated at $D_2$) of this axis of rotation when it is desired to cut spur gears or hypoid bevel gears. The tool cradle 11 is also adjustable along its axis of rotation OV. The mean position of the tool (here shown as a grinding wheel $t$) is indicated by the chain line TT. The tool is normally traversed along this line in order to machine the full length of a tooth flank on the work B, as at S.

The cradle spindle 12 carries at or near one end a disc or sector 13 which is coupled in non-slip relation to a second reciprocable generating roll component slide 14 which lies closely adjacent the plane containing the said first slide 9 and the disc or sector 8 coupled thereto. Adjustably clamped to this second slide 14 is a bracket 15 carrying a transversely slotted guide 16 in which works a trunnion block 17 carrying a pivot 18 for the adjacent end of the said first slide 9. Assuming, therefore, that the bearings (not shown) for the tool cradle spindle 12 are fixed, rotation $R_2$ of the cradle 11 about its axis is derived from the rotation $R_1$ of the work B in the work-head 1 through its associated disc or sector 3 and the coupling slide 4, the rotary transmission element 5 . . . 8 coupled thereto, the first slide 9 and the second slide 14. If the first and second slides 9, 14 are located parallel to each other, and all the discs or sectors 3, 5, 8, 13 have the same radius, the angular displacement $R_2$ of the cradle 11 about its axis will be equal to the angular displacement $R_1$ of the work B about its axis. If, under these conditions, the work axis AW is co-linear with the tool cradle axis OV, the machine will be set to generate the teeth of a crown wheel at B.

In order to vary the relationship between the angular rotation $R_1$ and $R_2$ of the work B and the cradle 11 respectively, the housing 10 is rotated on the spindle 6 to the desired angle and the bracket 15 is adjusted so that the trunnion block 17 is approximately centred in the transverse slot 16. The reciprocatory motion $D_4$ of the second slide 14 will then be related to the lengthwise reciprocatory motion $D_3$ of the first slide 9 by the sine of the angle between the longitudinal axes of these two slides. The angular rotations $R_1$ of the work B and $R_2$ of the cradle 11 about their respective axes will then also be related by the same factor.

If now it is desired to cut a spur gear, the cradle 11 is locked against rotation about its axis OV, and its spindle bearings are allowed to float in guides (indicated by the chain line 19) set parallel to the generating plane GG. With the work-head 1 adjusted so that the work axis AW is parallel to this plane, and the cradle 11 adjusted axially relative thereto so as to bring the tool $t$ into correct register with the periphery of the spur blank, it will be seen that the tool will be traversed in the direction $D_2$ past the blank B as the latter rolls on the generating plane GG about its axis AW, thus generating the desired tooth profile. If the spur gear to be generated has a base circle diameter equal to the maximum for which the machine is designed, the slides 9 and 14 will be parallel. For gears with smaller base circle diameters, it will be necessary to adjust the angle between the slides in order to impart the correct rate of lateral traverse $D_2$ to the tool. This angle is equal to the complement of the angle between a tangent to the given (smaller) base circle and the diameter which intersects the tangent on the circumference of the concentric maximum base circle.

For cutting skew bevel gears, or other forms of taper gears whose axes do not intersect, and are not parallel, the bracket 15 carrying the transversely slotted guide 16 is unclamped from the second slide 14 and the latter is moved bodily with the cradle 11 until the axis of rotation OV of the latter is offset from the work axis AW by the appropriate amount. The bracket 15 is then reclamped to the second slide 14 and the angle between this slide and the first slide 9 is adjusted to give the required proportionally between the rotation $R_1$ and $R_2$ of the work B and the cradle 11, respectively.

It is commonly understood in the art that an improved operation of the finished hypoid gear is obtained if a slight modification of the true generated tooth profile is made. To this end, therefore, it is preferred to make provision for a small vertical displacement of the tool cradle 11 during each generating roll of the work B. This displacement may be at constant or variable velocity according to particular requirements, and is achieved in the present embodiment of the invention by the provision of a cam 14a on the slide 14 which is engageable with a roller 14b mounted on a fixed pivot on a frame part of the machine. The cam 14a is preferably adjustable lengthwise of the slide 14 between an operative position, shown in full lines, and an inoperative position, shown in dotted lines. The action of the cam 14a and roller 14b is to raise and lower the whole assembly 11, 12, 13, 14 during reciprocation $D_4$ of the slide 14. It will be understood that the arrangement of the cam 14a shown in the drawing is intended purely to illustrate the particular displacement envisaged, and may be modified or changed in any convenient manner in a practical machine. The cam profile may be curved—concave or convex—if a non-linear relationship is required between the tool cradle 11 and the reciprocation $D_4$ of the slide 14.

The two limiting conditions for the machine are those associated with generating crown gears and spur gears respectively. In the first case, the work axis AW is at 90° to the generating plane GG and the first and second slides 9, 14, are adjusted to be parallel. In the second case the work axis AW is at 0° to the generating plane GG and the cradle 11 is locked against rotation, and is oscillated in the direction $D_2$ by the slide 14, the slides 9 and 14 again set parallel to each other when the diameter of the roll surface of the work is equal to the maximum for which the machine is designed. For lesser roll surface diameters, the slides 9 and 14 are set at the appropriate angle, as already described. It has been shown that both the limiting conditions can be satisfied by the mechanism described above, which will also satisfy all intermediate conditions for bevel gears of any angle.

In the above embodiment of the invention, it is envisaged that the axes of reciprocation of the coupling and second slides 4, 14 will at all times remain parallel to each other, although such a relationship is not geometrically necessary. It is obviously, however, of advantage in the construction of a machine that such a condition be satisfied. Moreover, the non-slip connection between any slide and an associated disc or sector may be of the nature of a rack-and-pinion connection, although in the interests of reducing friction and—even more important—backlash in a continually reversed action transmission, the flexible and inextensible tape connection to be described below is to be preferred.

If the generating plane in any given machine is regarded as horizontal the rotary transmission element 5, 6, 8 may rotate about an axis at any angle to the horizontal. It will, however, be necessary to allow for an effective change in axial length of the element with changes in the angle between the work axis AW and the generating plane GG.

Figure 2:
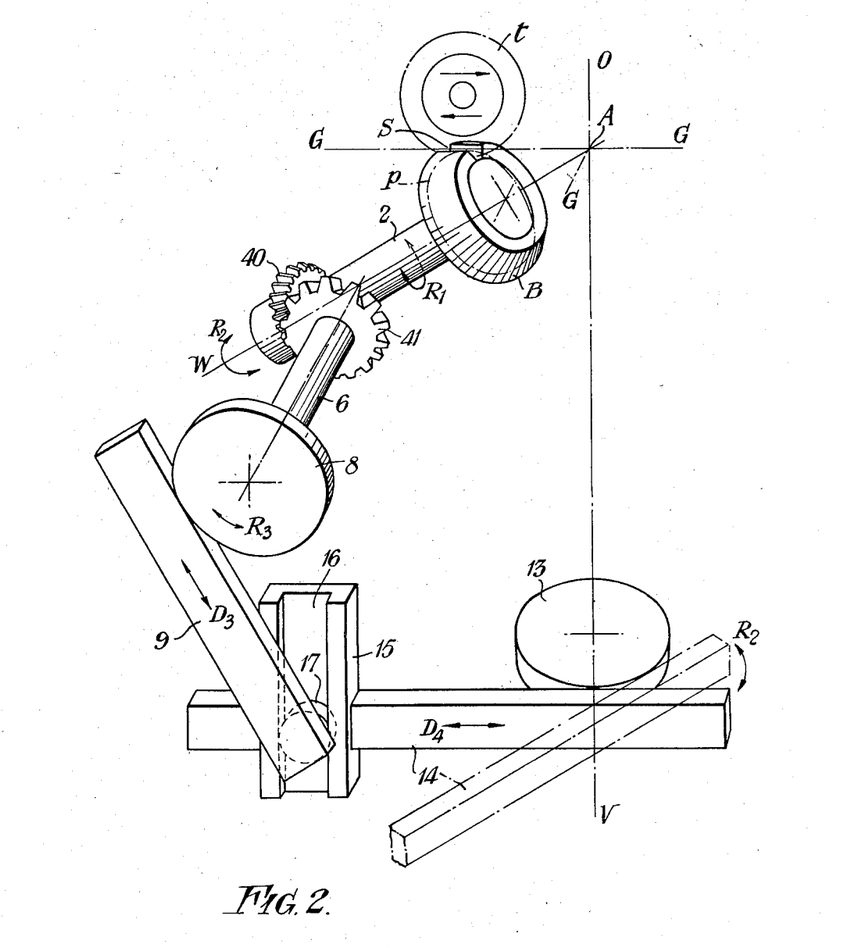
Fig. 2 is a schematic layout of a second embodiment in which the generating roll motion is wholly imparted to the work with respect to the machine frame.
Figure 3:
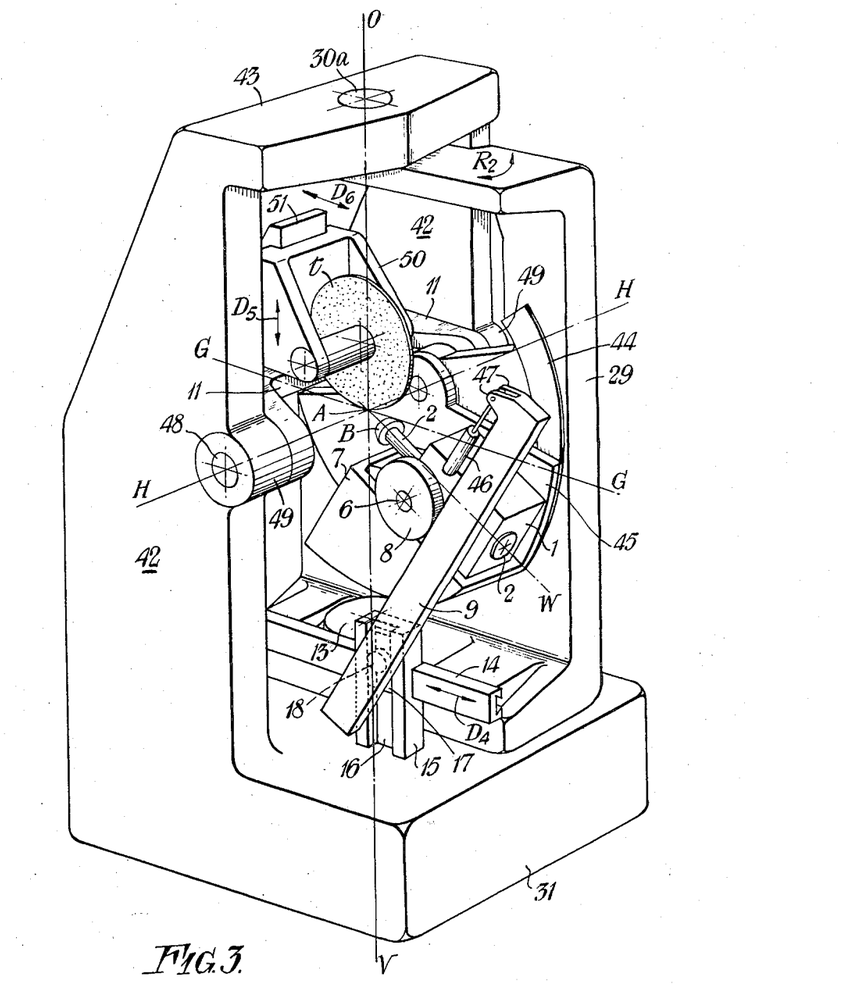
Fig. 3 is a perspective view of part of a machine embodying the layout of Fig. 2.

In the embodiment shown in Figures 2 and 3, the work spindle 2 has secured thereon a bevel gear 40 which meshes with another bevel gear 41 mounted on a transverse shaft 6 whose axis lies parallel to the generating plane GG. This shaft 6 also carries a disc 8 which is connected in non-slipping relation to the first slide 9, as shown in Fig. 1. The slide 9 is normally adjusted so that its longitudinal axis is normal to the plane containing the axes of the work spindle 2 and of the transverse shaft 6. The second rectilinear slide 14 is coupled, as in Fig. 1, in non-slipping relation to the tool cradle or base disc 13 whose axis OV is normal to the generating plane GG. This base disc is normally fixed in the frame of the machine, whilst the tool $t$ is traversed lengthwise of the tooth in guides fixed in the machine frame, so that the entire rolling motion of the gear blank B relative to the tool $t$ (considered in relation to the frame of the machine) is imparted to the blank.

Fig. 3 shows diagrammatically how the schematic layout of Fig. 2 can be embodied in a practical machine. The bed 31 of the machine has a pair of integral vertical side limbs 42 connected at their upper ends by a bridge piece 43 which houses a steady bearing 30a located coaxially with a corresponding foot bearing in the bed 31 (not visible in Fig. 3), these bearings serving as pivots and supports for the swinging frame 29. This frame is in the form of a shallow yoke having an arcuate bearing surface 44, struck about an axis HH in the generating plane GG, for an adjustable sector plate 45 which carries the work head 1 and saddle 7. The work head 1 is shown as a rectangular casing enclosing the bevel gears 40, 41 of Fig. 2 together with the bearings for the work spindle 2 and the shaft 6 on which the disc 8 is keyed. The housing which guides the first slide 9 is not shown in Fig. 3 in the interests of greater clarity of representation of the mechanism as a whole, but (as in Fig. 1) it would be journalled on the saddle 7 concentrically with the shaft 6. An hydraulic motor is indicated at 46 for operating the generating roll mechanism, its cylinder being mounted on the work head 1 and its piston rod being pinned to lugs 47 on the slide 9.

The tool cradle 11 has trunnions 48 journalled in trunnion blocks 49 formed on the side limbs 42 of the machine bed 31, the trunnions 48 being aligned on the axis HH. The tool $t$ is supported in a channel-shaped bracket 50 which is vertically slidable, as indicated at $D_5$, on a post 51 which is itself slidable, as indicated at $D_6$, on the cradle 11. The position of angular adjustment of the cradle 11 about the axis HH is selected according to the nature of the tooth flank profile to be generated on the gear blank B. Once this angular position has been selected, the cradle 11 is locked in any convenient manner in the side limbs 42.

In the schematic layout of Fig. 1, the proportionality between the displacements $D_1$ and $D_4$ of the slides 4 and 14 respectively is not automatically maintained for all angular positions of the work axis AW. In the layout of Fig. 2, however, this automatic maintenance of proportionality can be achieved provided that the axis of displacement of the first slide 9 is normal to the plane containing the work axis AW and the axis of the shaft 6; and that the ratio between the gears 40 and 41 is equal to the ratio of the diameter of the disc 13 to that of the disc 8.

Figure 4:
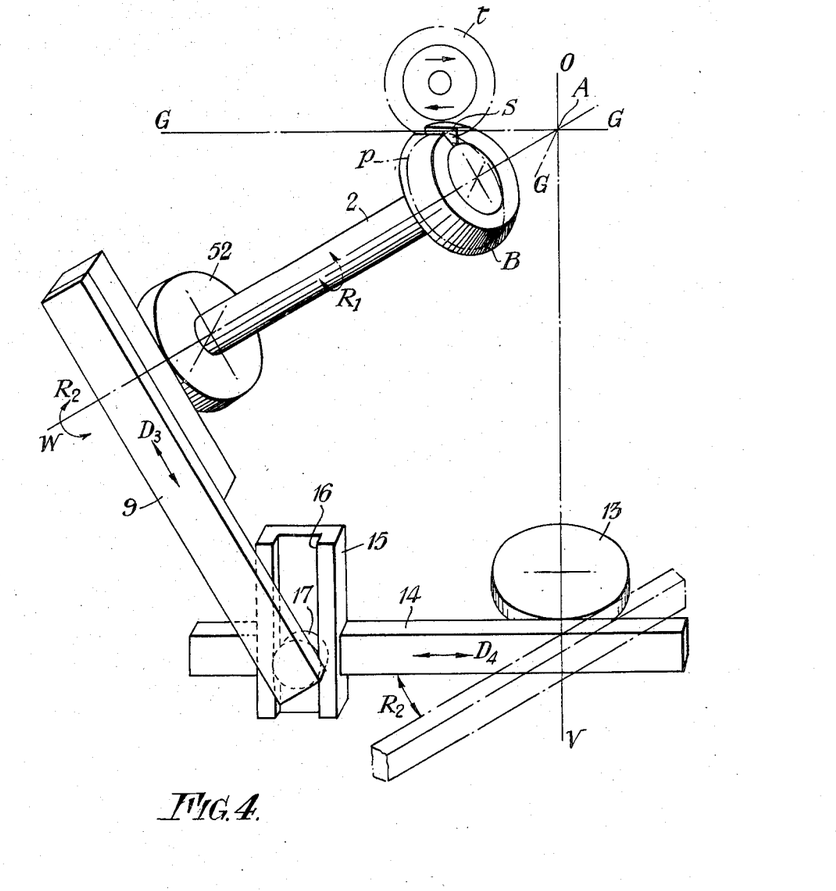
Fig. 4 is a schematic layout of a third embodiment operating on the same principle as that of Fig. 2.

In the modification shown in Fig. 4, the work spindle 2 carries a disc 52 which is connected to the first slide 9 in non-slipping manner, this slide being coupled by means of a pin and transverse slot connection 17, 16 to the second rectilinear slide 14 which itself is coupled in non-slipping fashion to the base or tool cradle disc 13, and is mounted on a rigid frame part (not shown) which also carries the work spindle 2 and is mounted to pivot about the axis OV. As the work spindle 2 is rotated, the first slide 9 reciprocates in the direction of its length and in doing so causes longitudinal reciprocation of the second slide 14, the motion of the latter being related to the motion of the first slide 9 in the ratio of the sine of the angle between the longitudinal axis of the first slide 9 and the vertical plane containing the axis AW of the work B. As the second slide 14 reciprocates in the rigid frame part which also carries the work spindle 2, it is constrained to roll longitudinally around the base or tool cradle disc 13 by virtue of the non-slipping engagement between the two parts. The work spindle 2 is accordingly moved bodily about the axis OV of the base disc 13 so that its own axis describes the surface of a cone, and the correct generating motion relative to the tool $t$ is derived.

This layout requires that the diameter of the discs 52, 13 be equal, and that the axis of reciprocation of the slide 9 must always be normal to the plane containing the axis AW and intersecting the generating plane GG in a line perpendicular to the line of traverse of the tool $t$ along the tooth flank. Hence the proportionality between the motions $D_4$ and $D_3$ of the slides 14, 9 respectively is automatically maintained with adjustment of the work spindle 2 to suit varying pitch angles of the work B.

This maintenance of proportionality, however, is not always desirable, as when a modified tooth profile is required to be generated. The layout also does not readily lend itself to convenient practical embodiment. The modified schematic layout of Fig. 5 whilst not fundamentally different from that of Fig. 4, has the second slide 14 turned through 90° and the slide 9 oscillatable on an axis whose angle to the plane referred to in connection with Fig. 4 is adjustable at will. The first slide 9 is also arranged to oscillate on an axis more nearly parallel to the generating plane GG (which will normally be horizontal) and its motion $D_3$ is transferred to the slide 14, in the chosen proportionality, through a subsidiary bar 62 lying parallel to the slide 14 and supported between arcuate horns 64 on the slide 14. The bar 62 is shown adjustably clamped at 63 to the horns 64, and carries the transversely slotted bracket 15.

Figure 5:
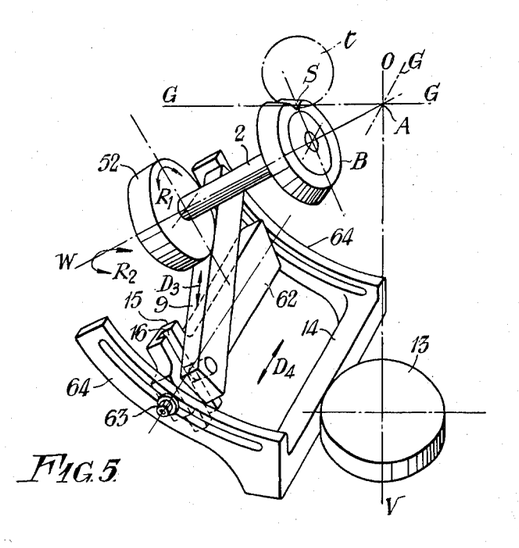
Fig. 5 is a modification of the layout of Fig. 4.

In this layout, the tool $t$ is most conveniently, though not necessarily, arranged to be traversed in guides fixed in the main frame of the machine, and the base or tool cradle disc 13 is then also fixed in the main frame. The work spindle 2 may, however, if preferred, be carried in bearings which are clamped in the main frame of the machine, the slide 14 then moving in guides in the frame and the tool cradle being mounted on the base disc 13.

Figure 6:
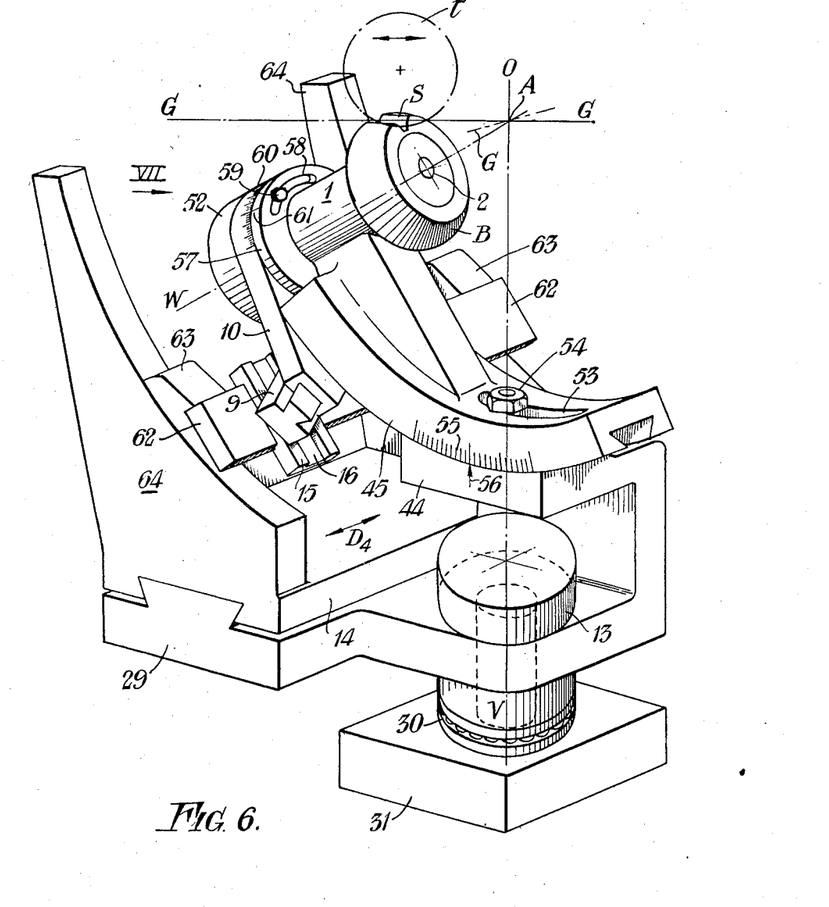
Fig. 6 is a view similar to Fig. 2 of a machine embodying the layout of Fig. 5.
Figure 7:
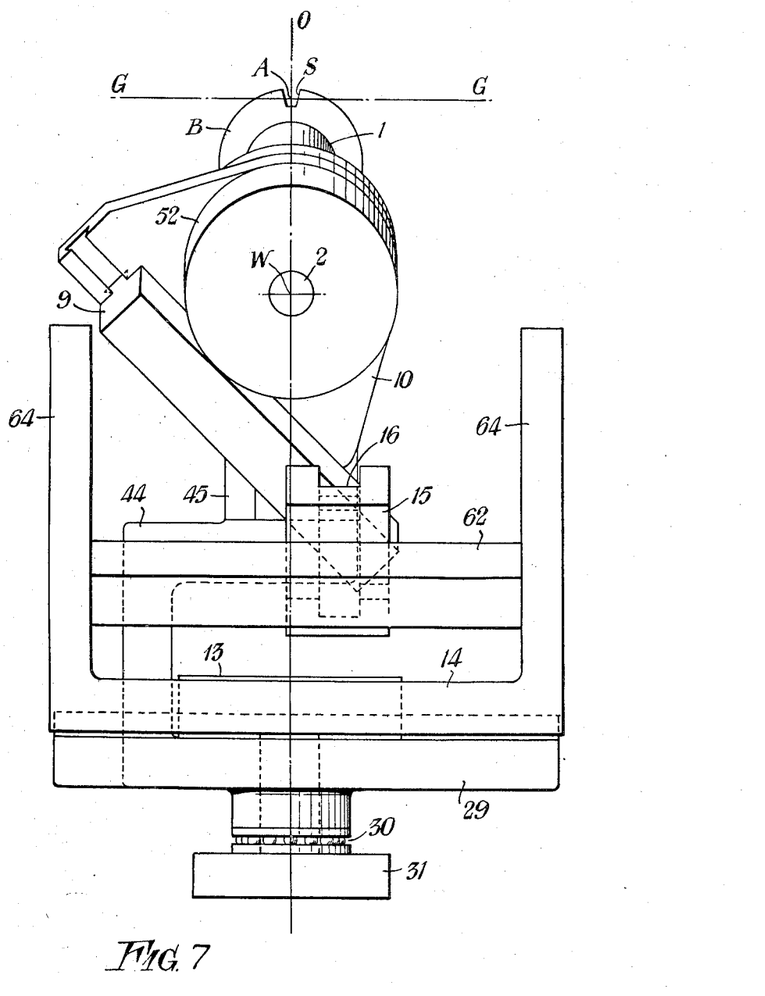
Fig. 7 is an end elevation on the arrow VII of Fig. 6.

Figs. 6 and 7 show diagrammatically a practical form of machine embodying the mechanism of Fig. 5. The base of the machine is indicated diagrammatically as a rectangular block 31 supporting a foot bearing 30 for a swinging frame 29. This frame carries the second slide 14 which is in non-slip engagement with the base disc 13. The latter is carried by the base 31, the tool $t$ being traversed lengthwise of the tooth flank in fixed guides in the machine frame.

The work head 1 is carried on an arcuate slide 45 struck about the cone apex A supported on a bearing bracket 44 on the swinging frame 29. The slide 45 is slotted at 53 to embrace a locking bolt 54 threaded into the bracket 44 for securing the head 1 in the position appropriate to the cone angle of the work B. A scale 55 is provided on the slide 45 and registers with an index mark 56 on the bearing bracket 44.

The work head 1 has a clamp plate 57 secured thereon. This plate has an arcuate slot 58 for receiving a locking bolt 59 threaded into a slide housing plate 10 which carires the first slide 9. The slide is in non-slip engagement with the disc 52 on the work spindle 2. The angle at which the slide 9 is set is indicated by a scale 60 provided on the edge of the plate 10 to register with an index mark 61 on the clamp plate 57.

The bracket 15 in which the guide slot 16 is formed is carried on a bar 62 having slippers 63 at its opposite ends for sliding engagement with the arcuate edges of horns 64 on the second slide 14, the said edges being struck about an axis through the cone apex A perpendicular to the work axis AW. The inclination of the slot 16 can thus be adjusted in accordance with the angular setting of the work head 1 as shown on the scale 55 (i. e. with the pitch angle of the work B).

During operation of the machine the tool $t$ is traversed along the length of the tooth flank. An inter-tooth space S is shown as having been machined in the work B. The drive for the generating roll mechanism is preferably applied to the work spindle 2 in any desired manner. The tool traverse is also effected in any preferred way.

Figure 8:
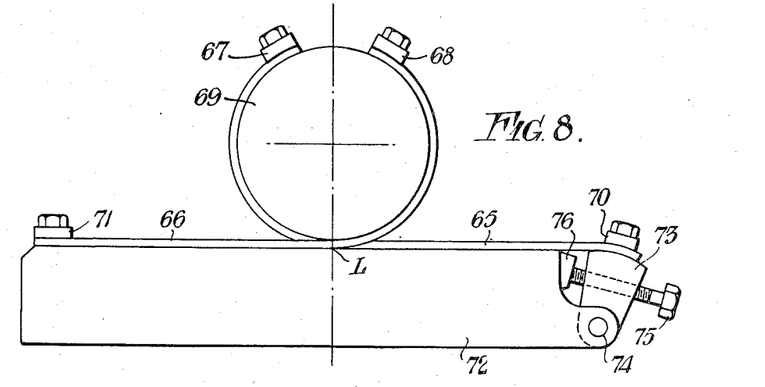
Figs. 8 and 9 are side and plan views respectively of a detail of the mechanism shown in any one of the preceding figures.
Figure 9:
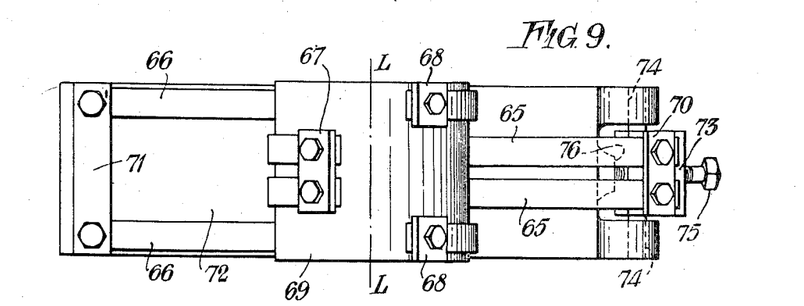

It will be understood that the manner of connecting a slide in non-slipping relation to a disc may take any preferred form. In general, it is envisaged that the connection will, as shown in Figs. 8 and 9, be constituted by two pairs of oppositely directed flexible but relatively inextensible bands 65, 66 whose one ends are anchored at 67, 68 respectively to the periphery of the disc 69 and whose other ends are secured at 70, 71 respectively to the slide 72 on opposite sides of the line of contact L between the slide and the disc. The required degree of tension is maintained in the bands 65, 66 by arranging the anchorage 70 on a bracket 73 pivoted at 74 on the slide 72 and carrying an adjusting screw 75 whose one end bears against a pad 76 on the slide. It is, however, to be understood that such an arrangement may be replaced by, say, a rack and pinion connection.

In all forms of machine according to the invention, the discs or sectors which are coupled to slides may have different radii according to design requirements.

The drive to the machine of any of the embodiments may be applied at any desired point in the mechanism according to convenience of layout of the machine. In general, however, it is envisaged that the drive would normally be applied to an intermediate member of the transmission between the work-head 1 and the tool cradle 11 or base disc 13 so that errors due to backlash in the mechanism, which are cumulative from the work B to the tool $t$ are reduced to a minimum and become, to some extent, self-cancelling. Provided that the necessary relative motions between the several parts of the mechanism are preserved, it is immaterial which part is regarded as fixed in relation to the frame of the machine. The choice of the particular part which is to be regarded as fixed will depend entirely on the considerations of design of the machine.

It is to be understood, as has already been stated above, that the foregoing description is purely or mainly schematic in nature, and a practical machine may call for a variety of mechanically equivalent constructions in order to allow for such considerations as availability of existing components, accessibility of parts for maintenance and replacement, simplicity of control and adjustment, and the like. The schematic arrangements described present however, whether in practical form or basic layout, a novel and useful form of gear generating machine having a wider range of application, both as regards type of gear and nature of tooth profile, than has hitherto been available, and this result is achieved with a minimum of complexity. Moreover, all parts may be of rugged construction to reduce maintenance and replacement difficulties.

Although a spur gear is sometimes regarded as a special case of a bevel gear having zero pitch angle, this is not strictly correct, since there is a discontinuity in the relationship between the rotation of the work about its axis AW and the rotation of this axis about the vertical OV at the transition from a bevel gear of minimum pitch angle to a spur gear. The term "cone apex" has, therefore, no strict relevance to a spur gear. Accordingly, where the present invention is to be applied to a machine for generating spur gears only, the point A, hereinbefore referred to as the cone apex of the work, will be chosen arbitrarily in the light of other design considerations.

In other respects, however, it is convenient, in this specification, to observe the common—even if misleading— convention of regarding a spur gear as a particular case of a bevel gear where the pitch or half cone angle is zero and the cone apex at an infinite distance from the work. In this sense the terminology used in the preceding description with particular reference to bevel gears is to be understood as applicable also to spur gears.

What I claim is:

1. In a gear generating machine, a frame, a tool cradle mounted in said frame, a work head mounted in said frame, said work head and tool cradle being movable relative to each other in a generating roll motion, a work spindle rotatably mounted in said work head, a first rectilinear slide drivingly connected to said work spindle, a first guide means mounted on said work head for supporting said first slide, a member secured to said tool cradle and being formed with an arcuate surface, the axis of which is normal to the generating plane defined by said tool cradle and work head, a second rectilinear slide securely engaging said arcuate surface, second guide means for supporting said second rectilinear slide in a plane normal to the axis of said arcuate surface, said first and second slides being drivingly connected to provide for the relative generating roll motion of said tool cradle and work head.

2. In a generating roll type gear generating machine for forming bevel gears, a frame, a tool cradle mounted in said frame, a work head mounted in said frame and adapted to have a workpiece positioned therein, a generating roll mechanism interconnecting said work head and tool cradle comprising a first rectilinear slide operatively connected to a work spindle and movable linearly in direct proportion to the angular motion of the workpiece about the axis thereof, guide means secured to said frame for supporting said first rectilinear slide, a member secured to said tool cradle and being formed with an arcuate surface, the axis of which is normal to the generating plane defined by said tool cradle and work head, a second rectilinear slide coupled to said arcuate surface, second guide means mounted on said frame for supporting said second rectilinear slide, and means for coupling said slides in angular relationship dependent upon the cone angle of said workpiece.

3. In a generating roll type gear generating machine for forming bevel gears, a generating roll mechanism comprising a first rectilinear slide having a linear displacement directly proportional to the angular displacement of the gear being formed about the axis thereof, a guide for said first slide movable with the axis of the gear being formed, a second rectilinear slide having a linear displacement directly proportional to the angular displacement of the gear being formed about a fixed axis normal to the generating plane of the machine, a second guide for said second slide movable with the angular displacement of the axis of the gear being formed, and means interconnecting said first and second slides, said interconnecting means being adjustable to maintain the ratio between the linear slides in accordance with the cone angle of the gear being generated.

4. In a generating roll type generating machine for forming bevel gears, a tool mounted on a support, a work head mounted on a support and adapted to have a workpiece secured thereto, said tool support and work head support being relatively movable, a generating roll mechanism interconnecting said supports and including a work spindle journalled in said work head, means for adjusting the angle of the axis of said spindle relative to the generating plane of said tool and work head, a cross shaft journaled in said work head support with the axis thereof parallel to said generating plane, means interconnecting said work spindle and cross shaft, a first rectilinear slide reciprocable in said work head support and secured to said cross shaft, an arcuate member secured to said tool support, the center thereof being located on an axis normal to said generating plane, a second rectilinear slide reciprocable in said work head support and secured to said arcuate member, and means interconnecting said first and second slides for permitting relative angular adjustment therebetween in accordance with the cone angle of said workpiece.

5. In a gear generating machine for forming bevel gears, a frame, a sub-frame mounted on said frame, a work spindle mounted on said sub-frame and adapted to have a workpiece secured thereto, a tool mounted on said frame, a generating roll mechanism including a first reciprocable slide mounted on said sub-frame and operatively connected to said work spindle, the movement of said first slide being directly proportional to the angular displacement of said workpiece about the axis thereof, a disc mounted on said frame and being concentric with the axis about which the axis of said workpiece is bodily angularly displaceable with respect to said tool, a second reciprocable slide mounted in said sub-frame and secured to said disc, means for compounding the displacement of said slides in accordance with the cone angle of said workpiece, and means for reciprocating one of said slides to produce the desired generating roll of said workpiece relative to said tool.

6. In a gear generating machine as claimed in claim 3, an oscillatory sub-frame carrying said guides for said first and second slides and mounted to swing about an axis normal to the generating plane, and a workholder for said gear to be formed also mounted on said sub-frame.

7. In a gear generating machine of the generating roll type for forming bevel gears, a generating roll mechanism comprising a first rectilinear slide having a linear displacement directly proportional to the angular displacement of the gear being formed about the axis thereof, a guide for said first slide movable with the axis of the gear being formed, a second rectilinear slide having a linear displacement directly proportional to the angular displacement of the gear being formed about a fixed axis normal to the generating plane of the machine, a second guide for said second slide movable with the angular displacement of the axis of the gear being formed, an oscillatory sub-frame carrying said guides for first and second slides, and pivotally mounted for swinging about an axis normal to the generating plane, and pin-and-slot means interconnecting said first and second slides and adjustable in dependence on the cone angle of said gear being formed to maintain a predetermined relationship between said cone angle and the ratio of the linear displacements of said slides.

8. In a gear generating machine of the generating roll type, a work-head having a spindle for rotatably mounting the work therein, means for angularly adjusting the axis of the work spindle relative to the generating plane, a cross-shaft having its axis parallel to the generating plane and geared to the work spindle, a first rectilinear slide connected to said cross-shaft so as to have a linear displacement proportional to the rotation of the cross-shaft about its axis, a second rectilinear slide mounted for linear displacement in a plane parallel to that of the first slide and proportional to the angular displacement of the work axis about an axis normal to the generating plane, respective guide means for said first and second slides, and an angular driving connection between the said slides which is adjustable so as to maintain a predetermined relationship between the ratio of the displacement of said slides and the cone angle of the work.

9. A bevel gear generating machine of the generating roll type comprising a main frame, a sub-frame oscillatable in said main frame, a work spindle mounted on said sub-frame and adapted to support a work-piece thereon, a tool mounted on said frame, a generating roll mechanism including a first reciprocable slide mounted in said sub-frame and having a positive driving connection with said work spindle so that the movement of said first slide is directly proportional to the angular displacement of said work-piece about the axis of said work spindle, a disc mounted on said main frame and being concentric with the axis about which the axis of said work-piece is bodily angularly displaceable with respect to said tool, a second reciprocable slide mounted in said sub-frame and having a positive connection with said disc, and a pin-and-slot connection between said first and second reciprocable slides for compounding the displacements of said slides in accordance with the cone angle of said work-piece, and means for reciprocating one of said slides in said sub-frame to produce the desired generating roll of said work-piece relative to said tool.

10. A bevel gear generating machine as claimed in claim 9 wherein said first and second slides are substantially coplanar, their common plane lying parallel to that containing the axes of said work spindle and said fixed disc.

11. A bevel gear generating machine of the generating roll type comprising a main frame, a subframe oscillatable in said main frame, a work spindle mounted on said sub-frame and adapted to support a work-piece, a tool mounted on said main frame, a generating roll mechanism including a first reciprocable slide mounted in said sub-frame and having a positive driving connection with said workspindle, the movement of said first slide being directly proportional to the angular displacement of said workpiece about the axis of said work spindle, a disc mounted on said main frame and being concentric with the axis about which the axis of said work-piece is bodily angularly displaceable with respect to said tool, a second reciprocable slide mounted in said sub-frame and having a positive connection with said disc, said second slide being reciprocable in a direction normal to the plane containing the axes of the work spindle and the fixed disc, and a pin-and-slot connection between said first and second reciprocable slides for compounding the displacements of said slides in accordance with the cone angle of said work-piece; and means for reciprocating one of the said slides in said sub-frame to produce the desired generating roll of said work-piece relative to said tool.

12. A bevel gear generating machine of the generating roll type comprising a main frame, an oscillatory sub-frame mounted on said main frame, a work-head located in said sub-frame, a work spindle mounted in said workhead and adapted to have a gear blank secured thereto, a tool carrier located on the main frame, a tool carried by said tool carrier, a fixed disc mounted on said frame and being concentric with the axis about which the axis of said gear blank is bodily angularly displaceable with respect to said tool, a first reciprocable slide carried by said sub-frame and operatively connected to said work spindle, the movement of said first slide being directly proportional to the angular displacement of said gear blank about the axis thereof, a second slide carried by said sub-frame and operatively connected to said disc, guide members for said first and second slides, the guide member for said first slide being angularly adjustable about said gear axis, an arcuate support structure rigidly mounted on the second slide and struck about the intersection of the gear axis and the generating plane, a rigid transverse bar adjustably clamped on said arcuate support structure, a pin-and-slot connection between said first and second slides for compounding the displacements of said slides in accordance with the cone angle of said gear blank and means for reciprocating one of said slides to produce the desired generating roll of said gear blank relative to said tool.

13. A gear generating machine as claimed in claim 12 wherein said arcuate support comprises a pair of parallel rigid side members spaced lengthwise of said second slide and having arcuate slots struck about a common axis lying in the generating plane and intersecting the axis of the base disc, said transverse bar extending between said side members and including means at each end for engaging said slots.

References Cited in the file of this patent

UNITED STATES PATENTS

| | | |
|---|---|---|
| 1,135,780 | Drummond et al. | Apr. 13, 1915 |
| 1,351,580 | Maag et al. | Aug. 31, 1920 |
| 2,376,110 | Aeppli | May 15, 1945 |
| 2,401,810 | Aeppli | June 11, 1946 |
| 2,442,734 | Suire | June 1, 1948 |

FOREIGN PATENTS

| | | |
|---|---|---|
| 183,010 | Switzerland | Mar. 15, 1936 |
| 225,015 | Switzerland | Dec. 31, 1942 |
| 362,799 | Great Britain | Dec. 10, 1931 |
| 547,146 | France | Sept. 13, 1922 |